E. G. STAUDE.
SPEED CONTROLLING DEVICE FOR SELF PROPELLED VEHICLES.
APPLICATION FILED JAN. 15, 1915.
1,206,936.
Patented Dec. 5, 1916.
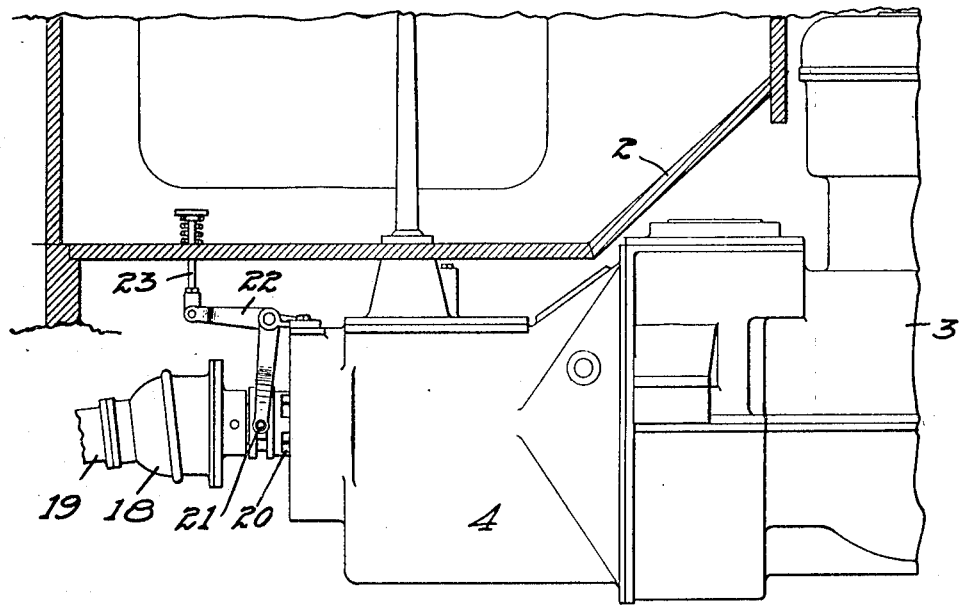
FIG. 1.
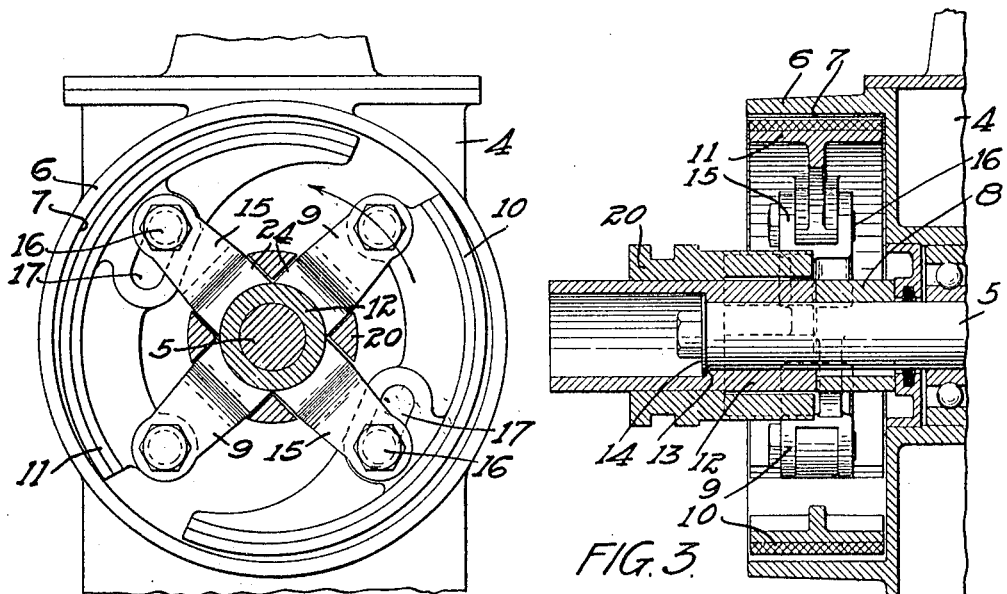
FIG. 2.
FIG. 3.
WITNESSES
INVENTOR
EDWIN G. STAUDE
BY
Paul & Paul
ATTORNEYS

UNITED STATES PATENT OFFICE.

EDWIN GUSTAVE STAUDE, OF MINNEAPOLIS, MINNESOTA.

SPEED-CONTROLLING DEVICE FOR SELF-PROPELLED VEHICLES.

1,206,936.          Specification of Letters Patent.          Patented Dec. 5, 1916.

Application filed January 15, 1915. Serial No. 2,371.

*To all whom it may concern:*

Be it known that I, EDWIN G. STAUDE, citizen of the United States, resident of Minneapolis, county of Hennepin, State of Minnesota, have invented certain new and useful Improvements in Speed-Controlling Devices for Self-Propelled Vehicles, of which the following is a specification.

My invention relates to power driven vehicles and particularly to motor cars or trucks.

The object of my invention is to provide a mechanism which will automatically check the speed of the vehicle in case it exceeds the speed of the engine, as when running down an incline.

A further object is to provide a device which may be rendered inoperative or ineffective as a braking means when the vehicle is driven backward.

A further object is to provide a device capable of application to any style or type of engine with comparatively little expense.

Other objects of the invention will appear from the following detailed description.

The invention consists generally in various constructions and combinations, all as hereinafter described and particularly pointed out in the claims.

In the accompanying drawings forming part of this specification, Figure 1 is a view, partially in section, through the foot board of the forward portion of a car, showing the relative position of the engine and gear box, Fig. 2 is a transverse sectional view, showing the transmission shaft and the arrangement of the braking mechanism, Fig. 3 is a sectional view, taken on a line at right angles substantially to the section line of Fig. 2.

In the drawing, 2 represents the foot board of a self-propelled vehicle, such as an automobile, and 3 a portion of the engine, arranged as usual in front of and below the foot board. This engine is provided with the usual gear box 4, which I have not thought necessary to illustrate in detail, and a transmission shaft 5 which projects rearwardly through the wall of the gear box. An annular flange 6 is preferably mounted on the gear box and may be formed integrally therewith, and encircles the end of the transmission shaft and is provided with an internal friction surface 7 that is concentric with said shaft. On the shaft 5 a sleeve 8 is secured and provided with oppositely projecting arms 9 which are pivotally connected at their outer ends to the ends of friction shoes 10 and 11 having curved outer surfaces to engage the stationary friction surface 7. A second sleeve 12 has one end loosely mounted on the shaft 5, abutting the end of the sleeve 8, and said sleeve 12 is preferably provided with an internal shoulder 13 that is engaged by a washer 14 on the end of the shaft for the purpose of holding the sleeve in place on the shaft. This sleeve 12 is also provided with oppositely projecting arms 15 having pivots 16 fitting within cam slots 17 in the shoes 10 and 11 at points midway substantially between the ends of these shoes. The slots are inclined to such an angle that when the pivot pins are moved therein they will bear on the outer edges of the slots and force the shoes outwardly to clamp them against the friction surface 7 and retard the speed of the car. The arms 9 and 15 being connected to the one pair of shoes, it is evident that when the sleeve 8 revolves with the shaft 5, that the shoes will be carried along also, the pivot pins 16 being at the ends of the slots 17 and the shoes out of contact with the friction surface. This will be the normal running relation of the parts. Should however, the speed of the car exceed that of the engine, as in running down an incline or when the engine is throttled, the excess speed of the car will revolve the sleeve 12 faster than the sleeve 8 and the pivot pins 16 will start to ride up on the cam surfaces of the slots 17, thereby forcing the shoes outwardly to grip the friction surface and check the speed of the car. This operation is performed automatically and continues until the speed of the engine corresponds to that of the car, when the shoes will be automatically released and the pivot pins 16 will slide down to the outer ends of the slots and the normal inactive position of the shoes will again be resumed.

The outer end of the sleeve 12 has a universal joint connection 18 with the shaft 19 through which power is transmitted to the vehicle axle. The details of this connection are not shown herein, as they form no part of my present invention.

With this device, as described, backing of the vehicle would set the friction shoes. I therefore prefer to provide a collar 20 slidably mounted on the sleeve 12 and having the usual clutch connection 21 with a bell crank 22 and pedal 23, this clutch connection allowing the collar to revolve with the sleeve and moving the collar inwardly or outwardly with the operation of the pedal. The arms 9 and 15 have seats 24 thereon for the inner end of the collar 20 and when the driver desires to back the machine, he can depress the pedal 23 and force the collar inwardly into engagement with the arms 9 and 15, so that these arms will be locked against relative movement, and if the pivot pins are at the outer ends of the cam slots, they will be held in this position until the driver releases the pedal. Relative movement of these arms not being permitted the shoes will, of course, be inactive while the vehicle is driven backward. The driver is thus able to temporarily render the friction brake device inoperative.

In various ways the details and arrangement of the parts in this device may be modified and still be within the scope of my invention.

I claim as my invention:

1. The combination, with a driving shaft, of a driven shaft, brake shoes and a friction surface therefor, means secured on said driving shaft and connected with said shoes, means loosely connected with said driven shaft and having a sliding cam bearing on said shoes, said means maintaining their normal relative position when the speed of said driving shaft equals or exceeds the speed of said driven shaft, and the relative position of said means being changed to engage said shoes with said friction surface when the speed of said driven shaft exceeds that of said driving shaft.

2. The combination, with a driving member and a driven member, of a brake device having means operatively connecting it with said driving member for simultaneous operation therewith, means connecting said driven member with said brake device and having a sliding engagement therewith and connected through said brake device with said driving member to be operated thereby, the sliding connection of said driven member with said brake device allowing the setting of said brake when the speed of said driven member exceeds that of said driving member.

3. The combination, with a driving member, of a driven member, brake shoes and a friction surface therefor, means operatively connecting said brake shoes with said driving member and said driven member, the connection of said driven member with said shoes having a sliding cam surface bearing thereon and the revolution of said driving member operating said driven member through said shoes, said shoes being normally inactive and out of contact with said friction surface but becoming seated thereon by the movement of said driven member connections on said cam surfaces when the speed of said driven member exceeds that of said driving member.

4. The combination, with a driving shaft and gear casing having a friction surface, of a sleeve secured on said shaft, arms radiating from said sleeve, shoes pivotally connected to said arms to engage said friction surface, a driven shaft, a sleeve connected therewith and loosely mounted on said driving shaft, arms projecting from said loosely mounted sleeve and having a pin and cam slot connection with said shoes, said driven shaft being normally revolved with said driving shaft through said arms and shoes and said shoes being forced into engagement with said friction surface through said arms and slots should the speed of said driven shaft exceed that of said driving shaft.

5. The combination, with a driving shaft and a driven shaft, of a brake device, arms having pivotal connections with said brake device, some of said arms being secured to said driving shaft and others of said arms being connected with said driven shaft, said driven shaft arms having sliding cam bearings on said brake device for seating it when the speed of said driven shaft exceeds that of said driving shaft, and means for engaging said arms to hold them in their relative position and prevent movement of said driven shaft arms on said braking device, for the purpose specified.

6. The combination, with a driving member and a driven member, of a brake mechanism including shoes having driving connections with said driving member and with said driven member, said driven member being normally operated from said driving member through the connections of said members with said shoes, the connections of said driven member being movable on said shoes to lock them in their braking position when the speed of said driven member exceeds that of said driving member, and means for holding said connections against relative movement and said shoes in an inactive position.

7. The combination, with a driving member and a driven member, of a brake device, arms having pivotal connections with said brake device, some of said arms being secured to said driving member and others of said arms being connected with said driven member, said driven member arms having sliding cam bearings on said brake device for seating it when the speed of said driven member exceeds that of said driving member, and a sliding sleeve mounted to engage said arms and hold them in their relative position and prevent movement of said driven member arms on said braking device independently of said driving member arms.

In witness whereof, I have hereunto set my hand this 6th day of January, 1915.

EDWIN GUSTAVE STAUDE.

Witnesses:
GENEVIEVE E. SORENSEN,
EDWARD A. PAUL.

Copies of this patent may be obtained for five cents each, by addressing the "Commissioner of Patents, Washington, D. C."